(12) United States Patent
Nakai et al.

(10) Patent No.: US 11,211,637 B2
(45) Date of Patent: Dec. 28, 2021

(54) LITHIUM BATTERY

(71) Applicant: Panasonic Intellectual Property Management Co., Ltd., Osaka (JP)

(72) Inventors: Miyuki Nakai, Osaka (JP); Yasuyuki Kusumoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 750 days.

(21) Appl. No.: 16/071,349

(22) PCT Filed: Aug. 29, 2016

(86) PCT No.: PCT/JP2016/003924
§ 371 (c)(1),
(2) Date: Jul. 19, 2018

(87) PCT Pub. No.: WO2017/130245
PCT Pub. Date: Aug. 3, 2017

(65) Prior Publication Data
US 2021/0210784 A1   Jul. 8, 2021

(30) Foreign Application Priority Data

Jan. 25, 2016   (JP) .............................. JP2016-011420

(51) Int. Cl.
| | | |
|---|---|---|
| *H01M 10/0567* | (2010.01) | |
| *H01M 4/06* | (2006.01) | |
| *H01M 4/136* | (2010.01) | |
| *H01M 4/58* | (2010.01) | |

(Continued)

(52) U.S. Cl.
CPC ......... *H01M 10/0567* (2013.01); *H01M 4/06* (2013.01); *H01M 4/136* (2013.01);
(Continued)

(58) Field of Classification Search
CPC ........ H01M 4/06; H01M 4/362; H01M 4/502; H01M 4/136; H01M 4/5825;
(Continued)

(56) References Cited

U.S. PATENT DOCUMENTS

| | | | | |
|---|---|---|---|---|
| 2009/0263722 A1* | 10/2009 | Sano | ....................... | H01M 6/16 |
| | | | | 429/231.95 |
| 2011/0070484 A1 | 3/2011 | Sano | | |

(Continued)

FOREIGN PATENT DOCUMENTS

| | | |
|---|---|---|
| CN | 104604014 A | 5/2015 |
| JP | 55-144663 A | 11/1980 |

(Continued)

OTHER PUBLICATIONS

International Search Report dated Nov. 8, 2018, issued in counterpart International Application No. PCT/JP2016/003924 (2 pages).

(Continued)

*Primary Examiner* — Carlos Barcena
(74) *Attorney, Agent, or Firm* — Westerman, Hattori, Daniels & Adrian, LLP

(57) ABSTRACT

A lithium battery includes a positive electrode, a negative electrode containing lithium, and a nonaqueous electrolyte having lithium-ion conductivity, wherein the positive electrode contains at least one selected from the group consisting of manganese oxide and graphite fluoride, and a powdered or fibrous carbon material is attached to at least part of the surface of the negative electrode opposite the positive electrode. Further, the nonaqueous electrolyte includes a nonaqueous solvent, a solute, a first additive, and a second additive, the solute contains $LiClO_4$, the first additive is $LiBF_4$, and the second additive is a salt having an inorganic anion that contains sulfur and fluorine.

6 Claims, 1 Drawing Sheet

(51) Int. Cl.
*H01M 4/583* (2010.01)
*H01M 4/50* (2010.01)
*H01M 10/0525* (2010.01)
*H01M 10/0568* (2010.01)
*H01M 10/0569* (2010.01)

(52) U.S. Cl.
CPC ......... *H01M 4/502* (2013.01); *H01M 4/5825* (2013.01); *H01M 4/5835* (2013.01); *H01M 10/0525* (2013.01); *H01M 10/0568* (2013.01); *H01M 10/0569* (2013.01)

(58) Field of Classification Search
CPC ........... H01M 4/5835; H01M 10/0567; H01M 10/0525; H01M 10/0568; H01M 10/0569
See application file for complete search history.

(56) References Cited

U.S. PATENT DOCUMENTS

| | | |
|---|---|---|
| 2011/0183218 A1 | 7/2011 | Odani et al. |
| 2012/0219866 A1 | 8/2012 | Onuki et al. |
| 2013/0244122 A1 | 9/2013 | Onuki et al. |
| 2014/0038062 A1 | 2/2014 | Kawakami et al. |
| 2014/0349198 A1 | 11/2014 | Lim et al. |
| 2016/0218399 A1 | 7/2016 | Mizuta et al. |

FOREIGN PATENT DOCUMENTS

| | | |
|---|---|---|
| JP | 2004-103372 A | 4/2004 |
| JP | 2011-91034 A | 5/2011 |
| JP | 2011-150958 A | 8/2011 |
| JP | 2011-175959 A | 9/2011 |
| JP | 2012-18916 A | 1/2012 |
| JP | 2013-251091 A | 12/2013 |
| WO | 2012/141180 A1 | 10/2012 |
| WO | 2015/064052 A1 | 5/2015 |

OTHER PUBLICATIONS

English Translation of Search Report dated Jul. 21, 2020, issued in counterpart CN Application No. 201680066452.7. (2 pages).

* cited by examiner

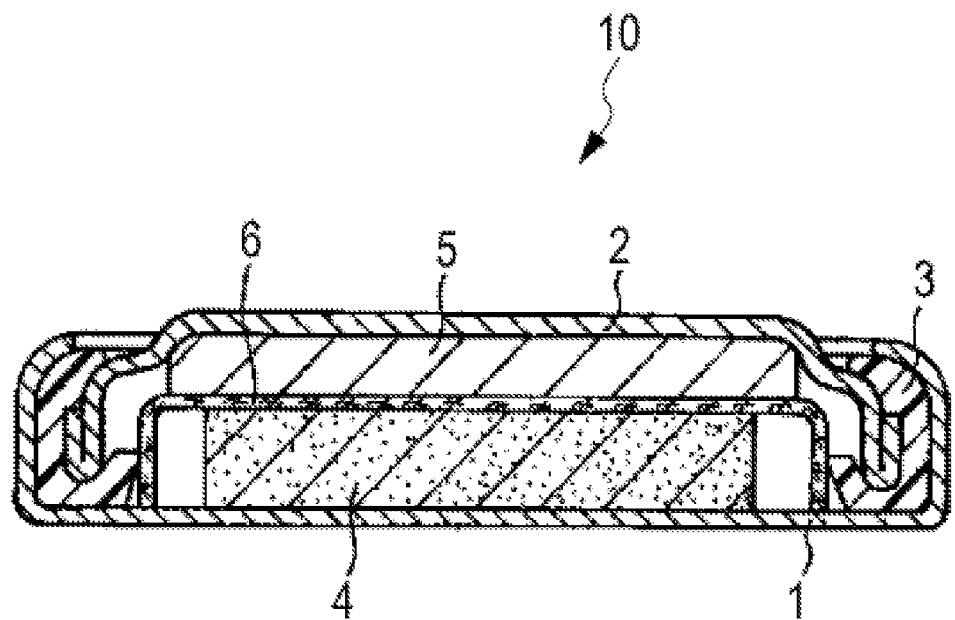

LITHIUM BATTERY

TECHNICAL FIELD

The present invention relates to a lithium battery and, in particular, to a lithium battery having good output characteristics at low temperature, even after being stored at high temperature.

BACKGROUND ART

In recent years, the range of applications of electronic equipment that uses a lithium battery as a power supply has expanded and, accompanying this, the range of the operating temperatures of the electronic equipment has tended to expand. For example, a lithium battery that is used for car-mounted electronic equipment, e.g., a sensor for an internal pressure of a tire, is required to be able to maintain functioning at a high temperature of 100° C. or higher for a predetermined time and to operate even at a low temperature of −40° C.

A lithium battery in which a manganese oxide or graphite fluoride is used as a positive electrode and lithium metal is used as a negative electrode has a wide operating temperature and is promising. However, a battery including lithium metal shows a significant voltage drop at low temperature. Subsequently, in order to improve the output characteristics of the lithium battery, it has been proposed to dissolve a fluorosulfonate into a nonaqueous electrolytic solution (PTL 1). For example, it is considered that lithium fluorosulfonate has functions of reducing the internal impedance of the battery and improving the output characteristics (PTL 2).

Meanwhile, regarding a battery in which lithium metal is used for a negative electrode, it has been proposed to attach a carbon material on a negative electrode surface or to add $LiBF_4$ to a nonaqueous electrolyte in order to improve the output characteristics at low temperature (PTL 3).

CITATION LIST

Patent Literature

PTL 1: Japanese Published Unexamined Patent Application No. 55-144663
PTL 2: International Publication No. 2012/141180
PTL 3: International Publication No. 2015/64052

SUMMARY OF INVENTION

Technical Problem

If a fluorosulfonate is dissolved into a nonaqueous electrolyte of a lithium battery, when the lithium battery is stored at high temperature, a side reaction, in which the fluorosulfonate is involved, proceeds on the positive electrode surface so as to generate deposits on the positive electrode surface. Products due to the side reaction move in the nonaqueous electrolyte so as to also generate deposits on the negative electrode surface. Consequently, if anything, the output characteristics of the lithium battery at low temperature are degraded after being stored at high temperature.

Solution to Problem

In consideration of the above-described problems, an aspect of the present disclosure relates to a lithium battery including a positive electrode, a negative electrode containing lithium, and a nonaqueous electrolyte having lithium-ion conductivity, wherein the positive electrode contains at least one selected from the group consisting of manganese oxide and graphite fluoride, a powdered or fibrous carbon material is attached to at least part of the surface of the negative electrode opposite the positive electrode. Further, the nonaqueous electrolyte includes a nonaqueous solvent, a solute, a first additive, and a second additive, the solute contains $LiClO_4$, the first additive is $LiBF_4$, and the second additive is a salt having an inorganic anion that contains sulfur and fluorine.

Advantageous Effects of Invention

According to the present disclosure, a lithium battery having good output characteristics at low temperature even after being stored at high temperature is provided.

BRIEF DESCRIPTION OF DRAWING

FIGURE is a sectional view showing an example of a coin-type lithium battery according to an embodiment of the present invention.

DESCRIPTION OF EMBODIMENTS

A lithium battery according to the present disclosure includes a positive electrode, a negative electrode containing lithium, and a nonaqueous electrolyte having lithium-ion conductivity. The positive electrode contains at least one selected from the group consisting of manganese oxide and graphite fluoride. A powdered or fibrous carbon material is attached to at least part of the surface of the negative electrode opposite the positive electrode. The nonaqueous electrolyte includes a nonaqueous solvent, a solute, a first additive, and a second additive. In this regard, the solute contains $LiClO_4$, the first additive is $LiBF_4$, and the second additive is a salt having an inorganic anion that contains sulfur and fluorine (hereafter referred to as a fluorine-containing sulfur salt).

When the carbon material is attached to at least part of the surface of the negative electrode opposite the positive electrode and the first additive and the second additive are added to the nonaqueous electrolyte, regarding the battery, even after being stored at 125° C. for 100 hours no significant degradation of the output characteristics is observed. Therefore, the battery exhibits excellent pulse discharge characteristics after being stored, even at, for example, a low temperature (for example, −40° C.).

It is considered that degradation of the output characteristics of the battery after being stored at high temperature is suppressed for the reasons described below.

First, it is conjectured that the first additive and the second additive interact with each other so as to form high-quality solid electrolyte interface (SEI) on the positive electrode surface during storage at high temperature. The high-quality SEI suppresses further occurrence of the side reaction, in which the nonaqueous electrolyte is involved, and suppresses an increase in deposits on the positive electrode surface and the negative electrode surface. Consequently, a reduction in the nonaqueous electrolyte and an increase in resistance are suppressed, and the output characteristics at low temperature after storage are not readily degraded. From the viewpoint of forming a higher-quality SEI, it is preferable that the fluorine-containing sulfur salt be at least one selected from the group consisting of $LiFSO_3$ and $LiN(FSO_2)_2$.

In this regard, if the fluorine-containing sulfur salt is added alone to the nonaqueous electrolyte, a high-quality SEI is not formed. In an environment in which the first additive is not present, the fluorine-containing sulfur salt tends to facilitate the side reaction on the positive electrode surface during storage at high temperature so as to increase a resistance component significantly.

Second, the carbon material attached to at least part of the surface of the negative electrode opposite the positive electrode suppresses generation of resistance components derived from the first additive and the second additive. When the carbon material is not present on the negative electrode surface, the first additive and the second additive tend to increase resistance components during storage at high temperature. For example, it is considered that the fluorine-containing sulfur salt forms, on the negative electrode surface, a nonconductor coating film that contains LiF as a primary component without forming a high-quality SEI.

In this regard, even when neither the first additive nor the second additive is included in the nonaqueous electrolyte, the output characteristics at an initial stage of use can be improved by attaching the carbon material to at least part of the surface of the negative electrode opposite the positive electrode. However, when the battery is stored at a high temperature (for example, 125° C.) for a long time (for example, 100 hours), the output characteristics are degraded significantly. Main causes of degradation of the battery are a decrease or exhaustion of the nonaqueous electrolyte due to decomposition, an increase in internal resistance, and the like.

An embodiment according to the present, invention will be described below in further detail.

A lithium battery according to the present embodiment includes a positive electrode, a negative electrode arranged opposite the positive electrode, and a nonaqueous electrolyte having lithium-ion conductivity. It is preferable that a separator composed of a porous material capable of holding the nonaqueous electrolyte be interposed between the positive electrode and the negative electrode.

The positive electrode is produced by forming a positive electrode mix that is a mixture including a positive electrode active material, an electrically conductive material, and a binder into a disc-like shape. Alternatively, the positive electrode is produced by making a positive electrode collector hold the positive electrode mix. Regarding the positive electrode collector, for example, stainless steel, aluminum, titanium, and the like can be used. The positive electrode mix can be made into a slurry by being mixed with a liquid component, applied to the surface of the positive electrode collector, and subjected to drying so as to be held on the positive electrode collector.

The positive electrode active material contains at least one of manganese oxide and graphite fluoride. The positive electrode active materials may be used alone or in combination. A battery containing manganese oxide as a positive electrode active material realizes a relatively high voltage and has excellent pulse discharge characteristics. Meanwhile, a battery containing graphite fluoride as a positive electrode active material has relatively excellent high-temperature storage characteristics and long-term reliability.

A typical oxidation number of manganese contained in the manganese oxide is tetravalent. However, the oxidation number is not limited to tetravalent, and some variation is allowable. Examples of usable manganese oxides include $MnO$, $Mn_3O_4$, $Mn_2O_3$, $MnO_2$, and $MnO_3$. In general, manganese oxides containing manganese dioxide as a primary component are used. The manganese oxide may be in a mixed crystal state in which a plurality of types of crystal states are included.

The specific surface area of the manganese oxide is preferably, for example, 0.5 to 7 $m^2/g$. When the specific surface area of the manganese oxide is set to be within the above-described range, the field of discharge reaction is readily and sufficiently ensured, and an effect of suppressing a decomposition reaction of the nonaqueous electrolyte is enhanced. Consequently, there are advantages in compatibility between the storage characteristics and the pulse discharge characteristics. The specific surface area of the manganese oxide is preferably 0.5 to 6 $m^2/g$, and further preferably 3 to 6 $m^2/g$.

Graphite fluoride is a compound denoted by a general formula $CF_x$ ($0.9 \le x \le 1.1$). Graphite fluoride is produced by, for example, fluorinating petroleum coke or artificial graphite.

Regarding the electrically conductive material, for example, natural graphite, artificial graphite, carbon black, and carbon fibers can be used. Examples of carbon black include acetylene black, Ketjenblack, channel black, furnace black, lamp black, and thermal black. These may be used alone, or at least two types may be used in combination. The amount of electrically conductive material included in the positive electrode mix is, for example, 5 to 30 parts by mass relative to 100 parts by mass of the positive electrode active material.

Regarding the binder, for example, olefin resins, e.g., polyethylene and polypropylene, fluororesins, e.g., polytetrafluorcethylene (PTFE), polyvinylidene fluoride, tetrafluoroethylene-hexafluoropropylene copolymers, and vinylidene fluoride-hexafluoropropylene copolymers, styrene butadiene rubber, fluororubber, and poly(meth)acrylic acid can be used. These may be used alone, or at least two types may be used in combination. The amount of binder included in the positive electrode mix is, for example, 3 to 15 parts by mass relative to 100 parts by mass of the positive electrode active material.

The negative electrode contains at least one of lithium metal and a lithium alloy. The lithium alloy is an alloy containing lithium and metal M in addition to lithium. Preferably, metal M contains at least one selected from the group consisting of Mg, Al, Ca, Ti, V, Cr, Mn, Fe, Co, Ni, Cu, and Zn. The content of metal M in the lithium alloy is preferably 20% or less in terms of atomic ratio. The negative electrode is produced by, for example, stamping a sheet of lithium metal or a lithium alloy into a disc-like shape. The negative electrode may be used by being attached to a negative electrode collector. For example, copper, nickel, or stainless steel can be used as the negative electrode collector.

The powdered or fibrous carbon material is attached to at least part of the surface of the negative electrode opposite the positive electrode. As a result, a side reaction between the negative electrode surface and the nonaqueous electrolyte (in particular, a side reaction between the negative electrode surface and the first additive or the second additive) can be reduced. In particular, when the positive electrode contains graphite fluoride, it is important to suppress formation of an insulating LiF coating film on the negative electrode surface.

The amount of the carbon material attached to the surface of the negative electrode opposite the positive electrode is preferably 0.02 $mg/cm^2$ to 10.0 $rag/cm^2$. As a result, an effect of suppressing generation of a resistance component on the negative electrode surface is enhanced and good electron conductivity of the negative electrode surface is readily ensured.

There is no particular limitation regarding the proportion of the area covered with the carbon material in the area of the surface of the negative electrode opposite the positive electrode. The proportion is, for example, 1% to 100%, preferably 30% to 100%, and further preferably 80% to 100%. In this regard, as the proportion of the area covered with the carbon material increases, the effect of maintaining the pulse discharge characteristics is enhanced. Incidentally, a surface covered with the carbon material can be distinguished from a surface not covered with the carbon material by, for example, photographing the surface of the negative electrode opposite the positive electrode and subjecting the photograph to binarization.

The carbon material may be combined with a porous holding material having a sheet-like shape. In this case, the carbon material may be held in advance by the porous holding material having a sheet-like shape. When the carbon material is uniformly held on a thin holding material, the carbon material can be attached, in a good state, to the negative electrode surface. The holding material with the carbon material may be attached to the surface of the negative electrode opposite the positive electrode. As a result, a step of attaching the carbon material to the negative electrode surface is readily performed. Consequently, scattering of the carbon material and dispersion of the carbon material into the nonaqueous electrolyte can be suppressed during assembly of a battery.

Preferably, a fiber material is used for the holding material so as to maintain the ion conductivity of the negative electrode surface. A nonwoven fabric is preferable as the fiber material. The material for forming the nonwoven fabric is preferably polypropylene or polyphenylene sulfide. It is preferable that the weight per unit area of the nonwoven fabric be 20 g/m$^2$ to 60 g/m$^2$ and that the thickness be 0.03 mm to 0.50 mm. A nonwoven fabric holding the carbon material is produced by, for example, coating or impregnating the nonwoven fabric with an alcohol dispersion containing the carbon material and, thereafter, performing drying.

Regarding the powdered or fibrous carbon material to be attached to the negative electrode surface, for example, natural graphite, artificial graphite, hard carbon, soft carbon, carbon black, carbon fibers, and carbon nanotubes can be used. Examples of carbon black include acetylene black, Ketjenblack, channel black, furnace black, lamp black, and thermal black. These may be used alone, or at least two types may be used in combination. In particular, carbon black is preferable, and the particle diameter thereof is preferably 5 nm to 8 μm.

The nonaqueous electrolyte includes a nonaqueous solvent, a solute, a first additive, and a second additive. In this regard, the solute contains $LiClO_4$ as an indispensable component. A nonaqueous electrolyte having excellent relative permittivity and excellent electrical conductivity is produced by using $LiClO_4$. In addition, $LiClO_4$ has good compatibility with cyclic carbonic acid esters and chain ethers.

The solute may further contain lithium salts, e.g., $LiPF_6$, $LiR^1SO_3$ ($R^1$ represents a fluoroalkyl group having a carbon number of 1 to 4), $LiN(SO_2R^2)(SO_2R^3)$ [each of $R^2$ and $R^3$ represents a fluoroalkyl group having a carbon number of 1 to 4], in addition to $LiClO_4$. The lithium salts may be used alone, or at least two types may be used in combination. The total concentration of the solute included in the nonaqueous electrolyte is preferably 0.2 to 2.0 mol/L, further preferably 0.3 to 1.5 mol/L, and particularly preferably 0.4 to 1.2 mol/L. In this regard, preferably 50% by mass or more and further preferably 80% by mass or more of the solute is $LiClO_4$.

In a lithium salt (sulfonate) denoted by $LiR^1SO_3$, a fluoroalkyl group having a carbon number of 1 to 4, represented by $R^1$, is preferably a perfluoroalkyl group having a carbon number of 1 to 4 and is specifically perfluoromethyl, perfluoroethyl, perfluoropropyl, perfluorobutyl, or the like. Meanwhile, in a lithium salt (imide salt) denoted by $LiN(SO_2R^2)(SO_2R^3)$, a fluoroalkyl group having a carbon number of 1 to 4, represented by each of $R^2$ and $R^3$, is preferably a perfluoroalkyl group having a carbon number of 1 to 4 and is specifically perfluoromethyl, perfluoroethyl, perfluoropropyl, perfluorobutyl, or the like. In this regard, these organic salts containing carbon are suitable for a solute because the organic salts are stable at an operation voltage of a battery and a side reaction does not readily occur.

Regarding the nonaqueous solvent, chain carbonic acid esters, e.g., dimethyl carbonate (DMC), diethyl carbonate (DEC), and ethylmethyl carbonate (EMC), cyclic carbonic acid esters, e.g., ethylene carbonate (EC), propylene carbonate (PC), and butylene carbonate (BC), chain ethers, e.g., 1,2-dimethoxyethane (DME), 1,2-diethoxyethane (DEE), and ethoxymethoxyethane (EME), cyclic ethers, e.g., tetrahydrofuran, 2-methyltetrahydrofuran, 1,3-dioxolane, and 4-methyl-1,3-dioxolane, and cyclic carbonic acid esters, e.g., γ-butyrolactone, and the like can be used. These may be used alone, or at least two types may be used in combination.

It is preferable that the nonaqueous solvent include a cyclic carbonic acid ester having a high boiling temperature and a chain ether having low viscosity even at low temperature. Preferably, the cyclic carbonic acid ester contains at least one selected from the group consisting of propylene carbonate (PC) and butylene carbonate (BC). Preferably, the chain ether contains dimethoxyethane (DME). In this case, the nonaqueous electrolyte contains propylene carbonate and butylene carbonate in a total proportion of preferably 40% to 98% by mass, further preferably 70% to 97% by weight, and particularly preferably 70% to 90% by weight. Such a nonaqueous solvent is excellent because of being electrochemically stable and having high electrical conductivity over a wide temperature range from low temperature to high temperature. The mixing ratio of PC and/or BC to DME ((PC and/or BC)/DME) in terms of volume ratio is preferably 5/95 to 100/0, and further preferably 10/90 to 80/20.

The first additive forms a coating film on the positive electrode surface so as to suppress decomposition of the nonaqueous electrolyte particularly in a high-temperature environment.

When the second additive (fluorine-containing sulfur salt) and the first additive are present together, a high-quality SEI is formed on the positive electrode surface in a high-temperature environment. Such a synergistic effect is enhanced by optimizing a quantitative balance between the first additive and the second additive.

The proportion of $LiBF_4$ serving as the first additive is preferably 3 to 60 parts by mass, and further preferably 4 to 40 parts by mass relative to 100 parts by mass of the solute included in the nonaqueous electrolyte. As a result, the amount of $LiBF_4$ consumed in the battery is optimized and an increase in the internal resistance of the battery can be delayed more effectively. At this time, the proportion of the fluorine-containing sulfur salt serving as the second additive is preferably 1 to 90 parts by mass relative to 100 parts by mass of the solute included in the nonaqueous electrolyte. As a result, an effect of suppressing the side reaction is enhanced. The ratio (M1/M2) of the mass (M1) of the first additive to the mass (M2) of the second additive included in the nonaqueous electrolyte is preferably 0.05 to 20.

In an aspect of a preferable composition of the nonaqueous electrolyte, the nonaqueous solvent is a mixed solvent in which the volume ratio of PC to DME (PC/DME) is 20/80 to 80/20, 90% by mass or more of the solute is $LiClO_4$, and the concentration of the solute is 0.3 to 1.0 mol/L. In this case, in the nonaqueous electrolyte, the content of the first additive ($LiBF_4$) is set to be preferably 3 to 60 parts by mass relative to 100 parts by mass of $LiClO_4$, and the content of the second additive (fluorine-containing sulfur salt) is set to be preferably 1 to 90 parts by mass relative to 100 parts by mass of $LiClO_4$.

In this regard, the first additive and the second additive are consumed by preliminary discharge after assembly of the battery and aging thereafter. Therefore, the amount of each additive is adjusted such that the content of each additive falls within the above-described ranges in the battery after aging (battery to be shipped).

Meanwhile, in the nonaqueous electrolyte before assembly of the battery, the amount of the first additive is preferably 2% to 6% by mass, more preferably 2% to 5% by mass, and further preferably 2% to 4% by mass relative to the total amount of the nonaqueous electrolyte. Also, the amount of the second additive is preferably 0.5% to 5% by mass, and more preferably 1% to 4% by mass relative to the total amount of the nonaqueous electrolyte.

In an embodiment of the present invention, each of the positive electrode and the negative electrode has a disc-like shape. Examples of lithium batteries having such a positive electrode and negative electrode include a coin-type battery and a button-type battery. Lithium batteries having the above-described configuration are suitable for use as primary butteries.

FIGURE is a sectional view showing an example of a coin-type or button-type lithium battery according to an embodiment of the present invention. However, the shape of the lithium battery is not limited to this, and various shapes, for example, a cylindrical type, a rectangular type, a sheet type, a flat type, and a multilayer type can be appropriately selected.

A lithium battery 10 includes a positive electrode 4, a negative electrode 5, a separator 6 interposed between the positive electrode 4 and the negative electrode 5, and a nonaqueous electrolyte, although not shown in the drawing. The positive electrode 4 is accommodated inside a battery case 1 that also serves as a positive electrode terminal, the negative electrode 5 is attached to the inner surface of a sealing plate 2 that also serves as a negative electrode terminal. A carbon material (not shown in the drawing) is attached to the surface of the negative electrode 5 opposite the positive electrode 4. An opening of the battery case 1 is blocked by the sealing plate 2. The peripheral portion of the sealing plate 2 is provided with a gasket 3. The open end portion of the battery case 1 is bended inward, and the gasket 3 between the battery case 1 and the sealing plate 2 is tightened so as to seal the inside of the battery.

For example, a nonwoven fabric or a microporous film is used as the separator 6. Regarding a material for forming the nonwoven fabric and/or the microporous film, for example, polyphenylene sulfide (PPS), polyethylene, polypropylene, a mixture of polyethylene and polypropylene, and a copolymer of ethylene and propylene are used.

Next, the present invention will be described further specifically with reference to the examples.

Example 1

(1) Production of Positive Electrode

A positive electrode mix was prepared by adding 5 parts by mass of Ketjenblack serving as an electrically conductive material and 5 parts by mass of polytetrafluoroethylene (PTFE) serving as a binder to 100 parts by mass of manganese dioxide and performing mixing sufficiently. The positive electrode was produced by forming the positive electrode mix into a disc-like shape having a diameter of 15 mm and a thickness of 3.0 mm and, thereafter, performing drying at 200° C.

(2) Production of Negative Electrode

A sheet composed of lithium metal having a thickness of 1.0 mm was stamped into a disc-like shape having a diameter of 16 mm and was used as a negative electrode.

Meanwhile, water and ethanol were added to acetylene black (average particle diameter of primary particles of 35 nm) serving as a carbon material and mixing was performed sufficiently so as to prepare a dispersion. One surface of a polypropylene (PP) nonwoven fabric (weight per unit area of 25 $g/m^2$) having a thickness of 0.25 mm and serving as a holding material was coated with the resulting dispersion by blowing and, thereafter, drying was performed at 60° C. for 6 hours. The amount of the carbon material held on the holding material (that is, the amount of carbon material attached to the negative electrode surface) was 1.0 $mg/cm^2$. The thus produced composite (carbon coat) of the carbon material and the holding material was stamped into a disc-like shape having a diameter of 15 mm.

(3) Preparation of Nonaqueous Electrolyte

A nonaqueous solvent was produced by mixing propylene carbonate (PC) and 1,2-dimethoxyethane (DKE) in a volume ratio of 1:1. The resulting nonaqueous solvent was used so as to prepare a nonaqueous electrolyte in which $LiClO_4$ serving as a solute was included in a proportion of 0.5 mol/L, and $LiBF_4$ in a proportion of 86 parts by mass and $LiFSO_3$ in a proportion of 21 parts by mass were included relative to 100 parts by mass of the solute ($LiClO_4$). Regarding the solute, $LiClO_4$ was used alone.

(4) Production of coin-type lithium battery

A stainless steel battery case (positive electrode terminal) having an opening and a bottom was prepared, and a positive electrode and a separator were disposed in this order inside the battery case. A polypropylene (PP) nonwoven fabric having a thickness of 0.45 mm was used as the separator. Meanwhile, a stainless steel sealing plate (negative electrode terminal) was prepared where the peripheral portion of the sealing plate was provided with a PPS gasket. The negative electrode was attached to the inner surface of the sealing plate. Further, the disc-like composite of the carbon material and the holding material was attached to the surface (surface opposite the positive electrode) of the negative electrode. The nonaqueous electrolyte was injected inside the battery case, and the positive electrode and the separator were brought into contact with the nonaqueous electrolyte. Thereafter, the opening of the battery case was blocked with the sealing plate, and the open end portion of the battery case was swaged to the peripheral portion of the sealing plate. Subsequently, preliminary discharge was performed at constant current of 4 mA for 2 hours, and standing for 3 days was further performed so as to produce the coin-type lithium battery (battery A1) shown in FIGURE.

(5) Analysis of Nonaqueous Electrolyte

The nonaqueous electrolyte was extracted from the coin-type lithium battery that had been left to stand for 3 days (corresponding to the state just before shipping). An ion chromatography analyzer was used, and quantitative analysis of each of $LiClO_4$, $LiBF_4$, and $LiFSO_3$ that was not consumed by a side reaction and the like with the positive electrode or the negative electrode was performed. As a result, relative to 100 parts by mass of the solute ($LiClO_4$), the amount of $LiBF_4$ was 23 parts by mass and the amount of $LiFSO_3$ was 1.4 parts by mass (M1/M2=16.4).

Example 2

A coin-type lithium battery (battery A2) was produced in the same manner as battery A1 except that the proportion of $LiFSO_3$ included in the nonaqueous electrolyte prepared was changed to 43 parts by mass relative to 100 parts by mass of the solute ($LiClO_4$).

Example 3

A coin-type lithium battery (battery A3) was produced in the same manner as battery A1 except that the proportion of $LiFSO_3$ included in the nonaqueous electrolyte prepared was changed to 86 parts by mass relative to 100 parts by mass of the solute ($LiClO_4$).

Example 4

A coin-type lithium battery (battery A4) was produced in the same manner as battery A1 except that $LiN(FSO_2)_2$ was used instead of $LiFSO_3$.

Example 5

A coin-type lithium battery (battery A5) was produced in the same manner as battery A2 except that $LiN(FSO_2)_2$ was used instead of $LiFSO_3$.

Example 6

A coin-type lithium battery (battery A6) was produced in the same manner as battery A3 except that $LiN(FSO_2)_2$ was used instead of $LiFSO_3$.

Comparative Example 1

A coin-type lithium battery (battery B1) was produced in the same manner as battery A1 except that $LiFSO_3$ was not included in the nonaqueous electrolyte.

Comparative Example 2

A coin-type lithium battery (battery B2) was produced in the same manner as battery A1 except that $LiBF_4$ was not included in the nonaqueous electrolyte.

Comparative Example 3

A coin-type lithium battery (battery B3) was produced in the same manner as battery A1 except that the composite (carbon coat) of the carbon material and the holding material was not attached to the surface (surface opposite the positive electrode) of the negative electrode.

[Evaluation of Physical Properties of Battery]

The batteries according to the above-described examples and comparative examples were evaluated as described below.

<Low-Temperature Pulse Voltage after High-Temperature Storage>

Each battery was subjected to preliminary discharge and standing for 3 days and, thereafter, an initial voltage was measured. Subsequently, each battery was stored in an environment at 125° C. for 100 hours and, then, each battery was moved into an environment at −40° C. and left to stand for 3 hours. After the temperature of the battery surface decreased to −40° C., a pulse battery (V) (CCV (Closed-circuit-voltage): voltage after discharge at 10 mA for 200 ms) was determined. The measurement results are shown in Table 1. In this regard, each of the numerical values of the first additive and the second additive shows the proportion of the mass relative to 100 parts by mass of the solute in the nonaqueous electrolyte after the battery was assembled and preliminary discharge and standing for 3 days were performed.

TABLE 1

| Battery | Carbon coat | $LiBF_4$* | $LiFSO_3$* | $LiN(FSO_2)_2$* | M1/M2 | Initial voltage (V) | Voltage after storage at 125° C. for 100 hours (V) |
|---|---|---|---|---|---|---|---|
| A1 | yes | 23 | 1.4 | — | 16.4 | 2.90 | 2.66 |
| A2 | yes | 28 | 11 | — | 2.54 | 2.91 | 2.79 |
| A3 | yes | 39 | 29 | — | 1.34 | 2.82 | 2.55 |
| A4 | yes | 8.8 | — | 22 | 0.40 | 2.94 | 2.68 |
| A5 | yes | 8.8 | — | 45 | 0.20 | 2.89 | 2.65 |
| A6 | yes | 8.8 | — | 89 | 0.10 | 2.91 | 2.76 |
| B1 | yes | 8.8 | — | — | — | 2.86 | 2.37 |
| B2 | yes | — | 1.4 | — | — | 2.71 | 0 |
| B3 | none | 23 | 1.4 | — | 16.4 | 2.41 | 0 |

*parts by mass relative to 100 parts by mass of solute

As shown in Table 1, in each example, excellent pulse characteristics were obtained. Meanwhile, in comparative example 1 in which only the first additive was included in the nonaqueous electrolyte, the low-temperature pulse characteristics after storage at 125° C. were degraded compared with example 1. Regarding comparative example 2 in which only the second additive was included in the nonaqueous electrolyte, an output after high-temperature storage was hardly obtained. Regarding comparative example 3 in which the composite of the carbon material and the holding material was not attached to the surface of the negative electrode, the low-temperature pulse characteristics were further degraded compared with comparative example 1. The reason for this is considered to be that the internal resistance was significantly increased by a side reaction (for example, lithium fluoride generation reaction) in which the first additive and the second additive were involved. Accordingly, it is clear that use of the first additive and the second additive in combination is important for improving the low-temperature pulse characteristics after storage at high temperature.

In this regard, it is considered that, even when the contents of the first additive and the second additive included in the nonaqueous electrolyte are decreased (or increased), an effect is exerted correspondingly. Meanwhile, when the amount of the carbon material (acetylene black) attached to the surface of the negative electrode opposite the positive electrode was changed within the range of 0.02 to 10.0 mg/cm$^2$), the same tendency as in the above-described examples was observed.

Here, the embodiment of the coin-type lithium battery (primary battery) has been described as the example. However, the present invention is not limited to this embodiment. The present invention can be applied to various forms, e.g., a cylindrical battery and a rectangular battery. In addition, the present invention can be applied to a lithium ion secondary battery by using a lithium alloy having high reversibility as the negative electrode.

INDUSTRIAL APPLICABILITY

The lithium battery according to the present invention is suitable for use in which equipment is operated in a wide temperature range of, for example, −40° C. to 125° C. The lithium battery according to the present invention can be applied to, for example, a tire-pressure-monitoring (management) system (TPMS).

REFERENCE SIGNS LIST

1: battery case (positive electrode terminal), 2: sealing plate (negative electrode terminal), 3: gasket, 4: positive electrode, 5: negative electrode, 6: separator, 10: lithium battery

The invention claimed is:

1. A lithium battery comprising a positive electrode, a negative electrode containing lithium, and a nonaqueous electrolyte having lithium-ion conductivity,
wherein the positive electrode contains at least one selected from a group consisting of manganese oxide and graphite fluoride,
a powdered or fibrous carbon material is attached to at least part of a surface of the negative electrode opposite the positive electrode,
the nonaqueous electrolyte includes a nonaqueous solvent, a solute, a first additive, and a second additive,
the solute contains LiClO$_4$,
the first additive is LiBF$_4$, and
the second additive is a salt having an inorganic anion that contains sulfur and fluorine, wherein the salt having an inorganic anion that contains sulfur and fluorine is at least one selected from a group consisting of LiFSO$_3$ and LiN(FSO$_2$)$_2$.

2. The lithium battery according to claim 1, wherein a proportion of the first additive is 3 to 60 parts by mass relative to 100 parts by mass of the solute.

3. The lithium battery according to claim 1, wherein a proportion of the second additive is 1 to 90 parts by mass relative to 100 parts by mass of the solute.

4. The lithium battery according to claim 1, wherein the nonaqueous solvent includes a cyclic carbonic acid ester and a chain ether.

5. The lithium battery according to claim 4,
wherein the cyclic carbonic acid ester includes at least one selected from a group consisting of propylene carbonate and butylene carbonate,
the chain ether includes dimethoxyethane, and
the nonaqueous electrolyte includes the at least one selected from a group consisting of propylene carbonate and butylene carbonate and the dimethoxyethane in a total proportion of 40% to 98% by mass.

6. The lithium battery according to claim 1, wherein each of the positive electrode and the negative electrode has a disc-like shape.

* * * * *